United States Patent [19]

Matsumura et al.

[11] 4,168,499
[45] Sep. 18, 1979

[54] ANTI-COLLISION RADAR SYSTEM PROVIDED WITH CIRCUITRY FOR MONITORING DRIVER'S ABILITY TO SAFELY CONTROL VEHICLE

[75] Inventors: Akira Matsumura, Yokosuka; Norio Fujiki, Yokohama, both of Japan

[73] Assignee: Nissan Motor Company, Limited, Japan

[21] Appl. No.: 920,339

[22] Filed: Jun. 29, 1978

[30] Foreign Application Priority Data

Jul. 29, 1977 [JP] Japan .................................. 52/90372

[51] Int. Cl.² .......................... B60T 7/12; G01S 9/02
[52] U.S. Cl. ................... 343/7 VM; 180/272; 180/271
[58] Field of Search ......... 343/7 VM; 180/99, 103 R, 180/103 A

[56] References Cited

U.S. PATENT DOCUMENTS

| | | | |
|---|---|---|---|
| 3,227,998 | 1/1966 | Platt | 180/103 R X |
| 3,689,882 | 9/1972 | Dessailly | 343/7 VM |
| 3,877,541 | 4/1975 | Takeuchi et al. | 180/99 |
| 3,952,301 | 4/1976 | Sorkin | 343/7 VM |
| 4,007,357 | 2/1977 | Yanagishima | 180/99 X |
| 4,017,843 | 4/1977 | Yanagishima | 180/99 |
| 4,073,359 | 2/1978 | Fujiki et al. | 343/7 VM X |

*Primary Examiner*—Malcolm F. Hubler
*Attorney, Agent, or Firm*—Lane, Aitken & Ziems

[57] ABSTRACT

A counter is provided for detecting the frequency of generation of collision imminence signals produced in a conventional type of anti-collision radar system for a vehicle. An odometer and/or a clock pulse generator is connected to the counter for applying a reference counting period so that the counter is utilized for generating a signal with which an alerting device which is independent from that of the radar system, is energized when the frequency reaches a predetermined value during the reference counting period.

12 Claims, 6 Drawing Figures

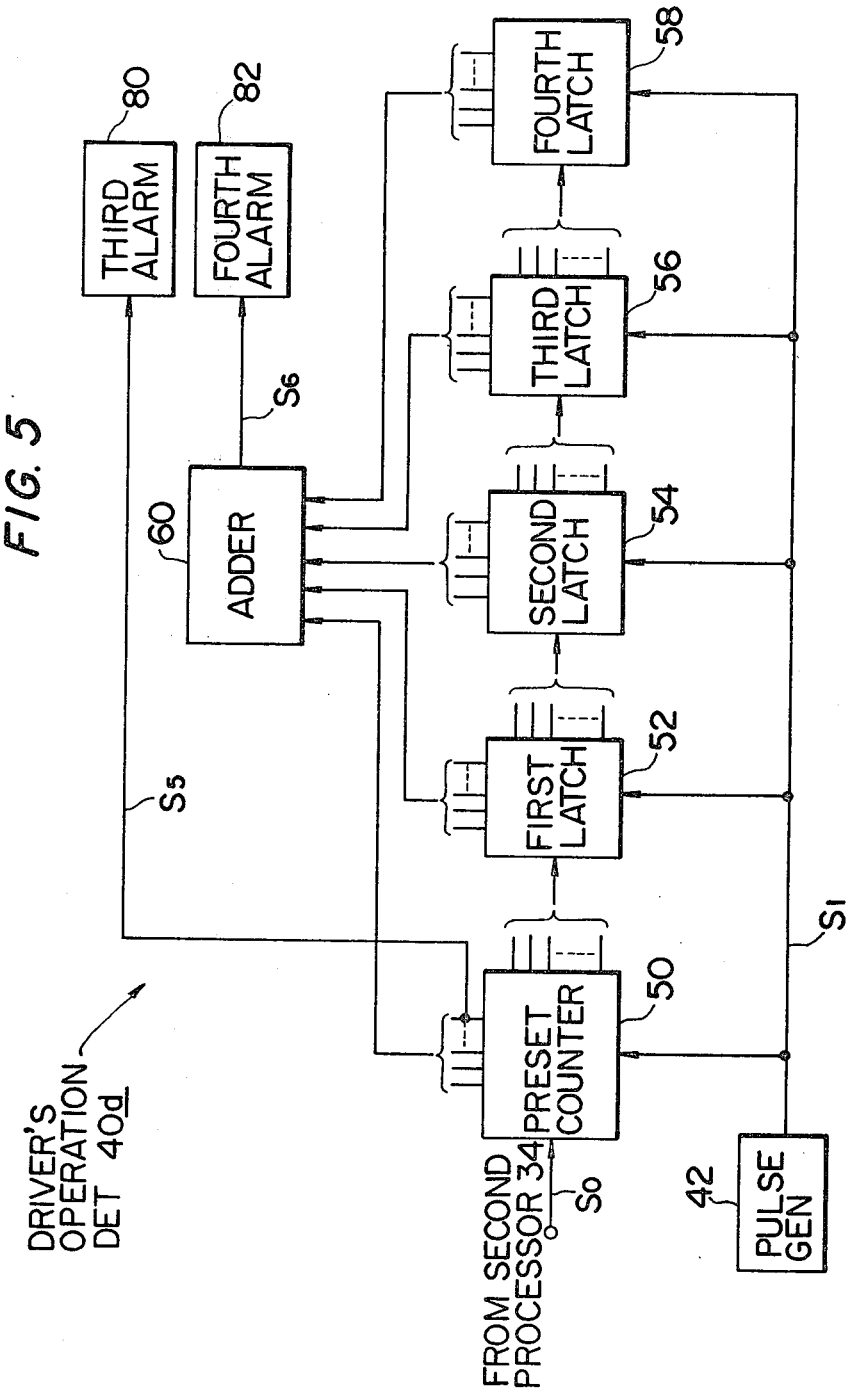

ANTI-COLLISION RADAR SYSTEM PROVIDED WITH CIRCUITRY FOR MONITORING DRIVER'S ABILITY TO SAFELY CONTROL VEHICLE

FILED OF THE INVENTION

The present invention generally relates to an anti-collision system for a vehicle. More specifically, the present invention relates to an apparatus which alerts a vehicle driver by checking whether the driver's operation of the vehicle is normal or not, i.e. safe or dangerous.

BACKGROUND OF THE INVENTION

In a conventional type of anti-collision system for a vehicle, a radar system which utilizes electromagnetic waves or light is used for detecting the distance between an obstacle ahead and the vehicle and the relative velocity between thereof. Signals which are respectively indicative of the distance and the relative velocity are utilized for deciding whether there is a possibility of collision or not through the consideration of the vehicle speed and other conditions such as the condition of the road surface. When the anti-collision radar system detects a possibility of a collision, the system generates a collision imminence signal with which an alarm signal is issued and/or the brakes of the vehicle are automatically actuated.

When such an anti-collision radar system is utilized, the frequency of the generation of the collision imminence signals is very low if the driver of the vehicle operates the vehicle correctly. According to experiments the average number of times of generation of such collision imminence signals is less than two times during 20 kilometers travel of a vehicle where the number obtained by experiments includes a number of collision imminence signals which are produced by miss detection, i.e. detection of obstacles such as poles standing along the road as dangerous obstacles. However, when the vehicle driver's condition is unusual, for instance the driver is very tired, sleepy or drunk, the driver cannot operate the vehicle correctly in a safe manner. Therefore, the frequency of the generation of the collision imminence signal is apt to become high since the vehicle tends to move meanderingly and/or the distance between an obstacle ahead such as a vehicle ahead and the vehicle is dangerously short.

Since such undesirable conditions of the vehicle driver are not pertinent for normal and safe driving of a vehicle, the driver should stop the vehicle as soon as possible in order to prevent a dangerous collision. However, in a conventional type of anti-collision system there is no means for checking if the driver's operation of the vehicle is good enough and thus the driver must decide whether his operation of the vehicle is normal or not by himself.

SUMMARY OF THE INVENTION

The present invention has been achieved to overcome the above mentioned drawback of the conventional type of anti-collision radar system for a vehicle. As described hereinabove, the frequency of the generation of the collision imminence signals indicates how well the driver operates the vehicle. Consequently, it is possible to see whether the driver's operation of the vehicle is normal or not by counting the number of the collision imminence signals per unit distance of the vehicle movement or per unit time.

According to the present invention, the number of the collision imminence signals produced by a conventional type of anti-collision radar system is counted for checking if the number of the collision imminence signals per unit distance of travel or per unit time is over a predetermined number or not. When the number is over the predetermined number, an alarm signal which is independent from an alarm signal produced in response to the collision imminence signal is issued for alerting the driver that his condition is so poor that he can not operate the vehicle safely and correctly.

It is therefore an object of the present invention to provide an improved anti-collision radar system equipped with circuitry which checks the driver's operation of a vehicle.

Another object of the present invention is to provide such a system which avoids the continuation of an unsafe operation of a vehicle.

BRIEF DESCRIPTION OF THE DRAWINGS

The features of the present invention will be more readily understood from the following detailed description taken in conjunction with the accompanying drawings in which:

FIG. 5 illustrates in a schematic block diagram a fourth embodiment of the anti-collision radar system for a vehicle according to the present invention.

DETAILED DESCRIPTION OF THE PREFERRED EMBODIMENTS

Figure 1:
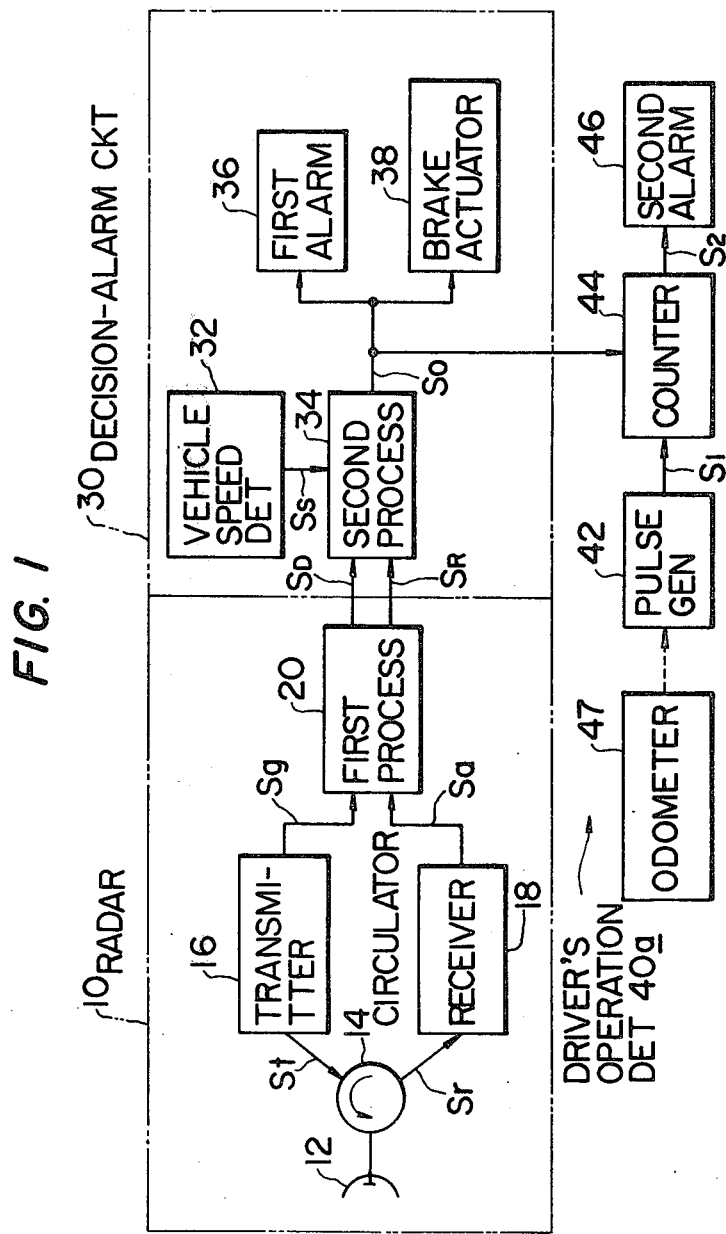
FIG. 1 illustrates in a schematic block diagram a first embodiment of the anti-collision radar system for a vehicle according to the present invention.

Reference is now made to FIG. 1 which shows a first preferred embodiment of the anti-collision radar system according to the present invention. The anti-collision radar system shown in FIG. 1 includes a radar 10, decision-alarm circuitry 30, and a driver's operation detector 40a. The radar 10 consists of an antenna 12, a circulator 14, a transmitter 16, a receiver 18 and a first processor 20. The decision-alarm circuitry 30 consists of a vehicle speed detector 32, a second processor 34, a first alarm 36 and a brake actuator 38. The driver's operation detector 40a consists of a pulse generator 42, a counter 44 and a second alarm 46. The pulse generator 42 may be connected to an odometer 47 as shown by a dotted line. The radar 10 and the decision-alarm circuitry 30 are conventional types and are shown enclosed by chain lines.

The transmitter 16 includes a SHF (super high frequency) oscillator, a modulator and an amplifier (none of them are shown). An output of the transmitter 16 is connected to an input of the circulator 14 which is connected to the antenna 12. The antenna 12 is utilized for transmitting the electromagnetic waves produced in the transmitter 16 and for receiving the echo signals which are reflected by a target or an obstacle ahead. An output of the circulator 14 is connected to the receiver 18 which includes an amplifier and a detector (both are not shown). With this provision a modulated (frequency modulation or pulse modulation) SHF signal St is transmitted from the antenna 12 and a reflected echo signal Sr is received by same and is fed to the receiver 18. The echo signal Sr is amplified and thus an amplified echo signal Sa is applied to an input of the first processor 20 while another input of the first processor 20 is fed with a trigger signal Sg produced by the transmitter 16. The first processor 20 is so arranged that it generates two signals $S_D$ and $S_R$ which respectively indicates the distance between the vehicle and an obstacle ahead and the relative velocity between thereof.

The vehicle speed detector 32 detects the velocity of the vehicle with respect to ground and produces an output signal $S_S$ indicative thereof. The output of the vehicle speed detector 32 is connected to an input of the second processor 34 which also receives the above mentioned two signals $S_D$ and $S_R$ at other inputs thereof. The second processor 34 is so arranged that it generates an output signal (collision imminence signal) $S_O$ when the second processor 34 decides that there is a possibility of collision of the vehicle by analyzing the relationship between the distance, the relative velocity and the vehicle speed. The collision imminence signal $S_O$, i.e. the output signal of the second processor 34 is fed to the first alarm 36, such as a buzzer or a lamp, and to the brake actuator 38. Although the collision imminence signal $S_O$ is fed to both of the first alarm 36 and the brake actuator 38 in the first embodiment, one of them may be omitted if desired.

The above mentioned radar system construction is same as the conventional type of anti-collision systems. According to the present invention, the collision imminence signal $S_O$ is also fed to the counter 44 included in the driver's operation detector 40a. The counter 44 is connected to the pulse generator 42 and the second alarm 46 both included in the driver's operation detector 40a.

The pulse generator 42 is arranged to produce an output pulse signal $S_1$ periodically or in response to one or more vehicle parameters such as the distance traveled by the vehicle. In the former case, the pulse generator 42 is a clock pulse generator which generates output pulses at predetermined time intervals. In the latter case, the pulse generator may be arranged to produce an output pulse signal $S_1$ in response to an output signal of an odometer 47 which is shown connected via a dotted line in FIG. 1. The odometer 47 is arranged to produce an output signal $S_3$ each time the vehicle travels a predetermined distance, for instance 20 kilometers. The pulse generator 44 is thus triggered to produce the output pulse $S_1$ by the odometer output signal $S_3$.

The output pulse signal $S_1$ of the pulse generator 42 is supplied to the counter 44 for resetting same. The counter 44 is a pre-set type and thus produces an output signal $S_2$ when the number therein reaches a predetermined number during a counting period defined between the pulse signals $S_1$. The output of the counter 44 is connected to an input of the second alarm 46 so that the alarm 46 is energized upon presence of the output signal $S_2$ of the counter 44. With this arrangement, the second alarm 46 issues an alarm signal when the number of the collision imminence signals $S_O$ per unit distance of the vehicle reaches the predetermined number, for instance 4, if the odometer 47 is connected to the pulse generator 42, for alerting the vehicle driver that the operation of the vehicle is poor or abnormal. Namely, the second alarm 46 informs the driver that the first alarm 36 and the brake actuator 38, if both are provided as shown, are actuated more than four times per 20 kilometers travel of the vehicle.

The radar 10 and the decision-alarm circuitry 30 may be other types, different in construction from those shown in FIG. 1, since the circuitry shown enclosed by the chain lines is merely an example of a conventional anti-collision radar system.

When a clock pulse generator is utilized as the pulse generator 42, as mentioned above, a reset signal such as the signal $S_1$ is produced at predetermined time intervals, for instance 15 minutes. Such a clock pulse generator is advantageous when the average vehicle speed is extremely low because of trafic jams and the like. Therefore, it is preferable to provide both of the odometer and the clock pulse generator and use the latter for city use, especially for downtown use. In such a case the odometer 47 and the clock pulse generator may be utilized for producing the reset signal $S_1$ by manually switching the outputs thereof.

Figure 2:
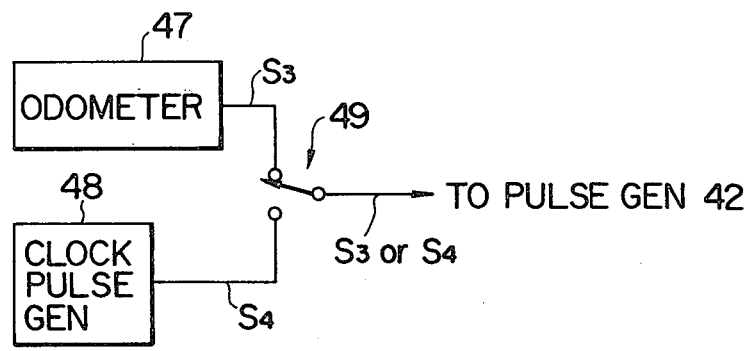
FIG. 2 illustrates in a schematic block diagram a variation of the first embodiment of the anti-collision radar system for a vehicle according to the present invention.

Hence, reference is now made to FIG. 2 which shows a variation of the first embodiment of the anti-collision radar system according to the present invention in which the reset signals $S_3$ and $S_4$ are produced in both of the odometer 47 and a clock pulse generator 48. A manual switch 49 is provided for selectively supplying one of the output signals $S_3$ and $S_4$ of the odometer 47 and the clock pulse generator 48 to the pulse generator 42 for triggering same. Other arrangements of the variation of the first embodiment are the same as that shown in FIG. 1 and thus the description thereof is omitted.

Figure 3:
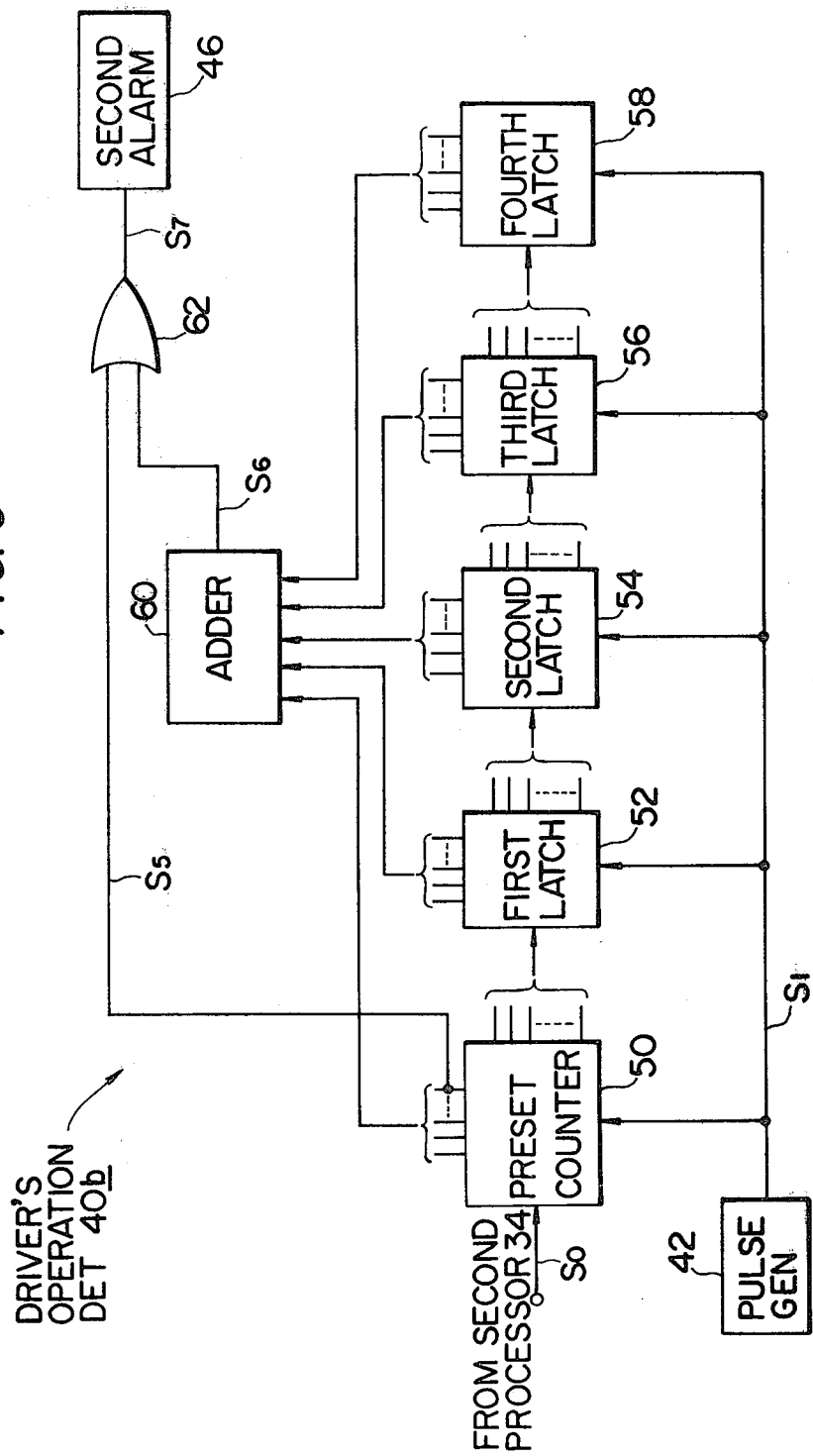
FIG. 3 illustrates in a schematic block diagram a second embodiment of the anti-collision radar system for a vehicle according to the present invention.

FIG. 3 illustrates a second embodiment of the anti-collision radar system according to the present invention. In the second embodiment the same radar and a decision-alarm circuitry such as shown in FIG. 1, are utilized but are not shown in FIG. 3 for simplicity. The circuitry shown in FIG. 3 includes a drivers operation detector 40b which includes a pulse generator 42, a counter 50, first to fourth latches 52, 54, 56 and 58, an adder 60, an OR gate 62 and a second alarm 46. The same elements as in FIG. 1 are designated by same numerals.

The output of the second processor 34 shown in FIG. 1 is connected to an input of the counter 50 instead of the counter 44 shown in FIG. 1. The pulse generator 42 is arranged to produce an output pulse $S_1'$ after each predetermined distance traveled by the vehicle in the case the odometer 47 is connected to the pulse generator 42. The output of the pulse generator 42 is connected to the counter 50 and the first to fourth latches 52, 54, 56 and 58. The output signal $S_1'$ of the pulse generator 42 is utilized as a shift-command signal. The number of collision imminence signals $S_O$ is counted by the counter 50 and thus the stored number in the counter 50 is shifted, upon presence of the signal $S_1'$, to the first latch 52. After the stored number is shifted, the counter 50 starts counting the number of the collision imminence signals $S_O$ again until the next shift-command signal $S_1'$ is applied thereto. The number stored in the first latch 52 is then shifted to the second latch 54 upon presence of the next shift-command signal $S_1'$. Successively the stored number is shifted to the right to the next latch is indicated by directed lines in FIG. 3 in the same manner.

The counter 50 produces a carry signal $S_5$ when a predetermined number of collision imminence signals $S_0$ is fed to same during a time period between two consecutive shift-command signal $S_1'$. If the counter 50 is a binary counter, the counter 50 produces the carry signal $S_5$ when the number of the collision imminence signals $S_5$ reaches 2. The output carry signal $S_5$ of the counter 50 is applied to an input of an OR gate 62.

Each of the counter 50 output and the first to fourth latches 52, 54, 56 and 58 outputs are respectively connected to inputs of an adder 60 while the output of the adder 60 is connected to another input of the OR gate 62. The adder 62 produces an output signal $S_6$ when the added number obtained by adding the stored numbers of the counter 50 and each first to fourth latches 52, 54, 56 and 58, reaches a predetermined number. The output of the OR gate 62 is connected to an output of a second alarm 46.

Assuming the pulse generator 42 generates the shift-command signal $S_1'$ after each four kilometers of travel, the counter 50 is a binary counter and the adder 60 produces the output signal $S_6$ when the added number reaches 4, then the OR gate 62 produces an output signal $S_7$ upon presence of either the carry signal $S_5$ or the output signal $S_6$ of the adder 60. Consequently, the second alarm 46 is energized when either the collision imminence signal $S_0$ is fed to the counter 50 twice during 4 kilometers of travel or the collision imminence signals $S_0$ are fed to the counter 50 four times during 20 ($4 \times 5 = 20$) kilometers of travel.

If an alarm signal is issued from the second alarm 46 and the vehicle driver reinstates normal operation of the vehicle, then no alarm signal will be issued from the second alarm 46 since the stored numbers in the counter 50, first to third latches 52, 54 and 56 are arranged to be shifted to the next latch upon presence of the shift command signal $S_1'$ while the stored number in the fourth latch 58 is arranged to be cleared upon presence of same. It is to be noted that in the second embodiment shown in FIG. 3, five units of distance travled by the vehicle are provided viz. 4, 8, 12, 16 and 20 kilometers. However, the units of the distance traveled may be changed if desired. If more than four latches are connected in series, the larger unit, for instance 20 kilometers, may be divided into more than five smaller units.

Figure 4:
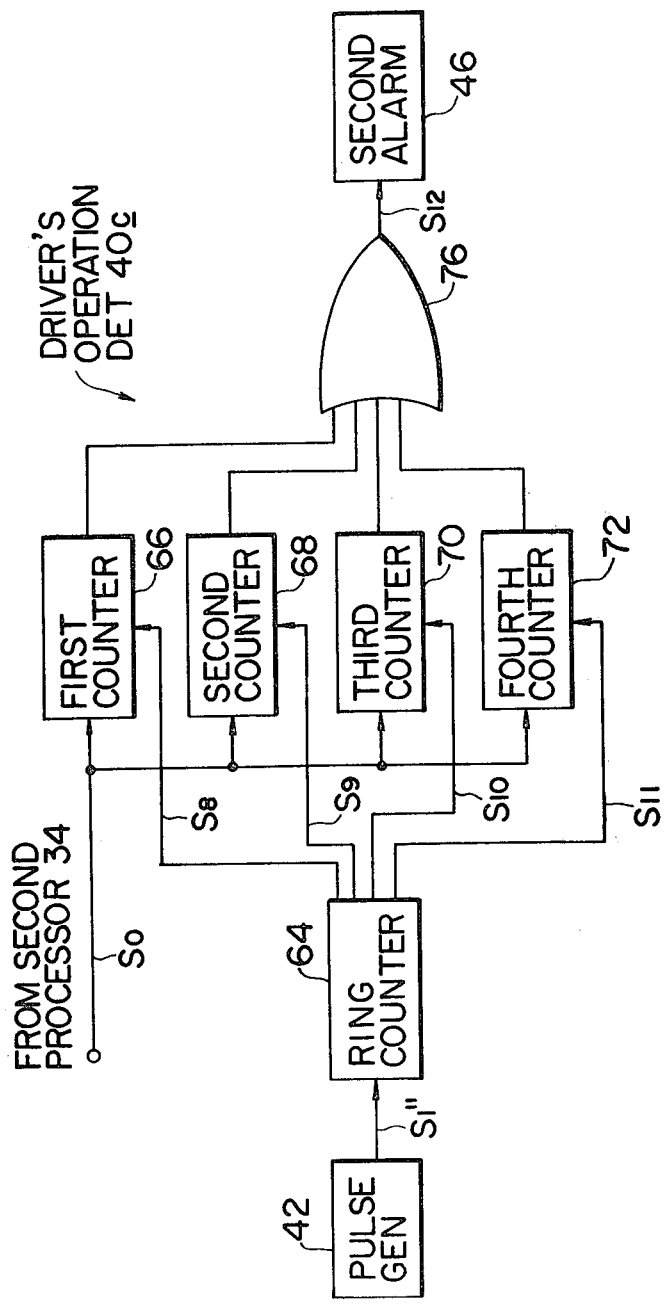
FIG. 4 illustrates in a schematic block diagram a third embodiment of the anti-collision radar system for a vehicle according to the present invention.

Reference is now made to FIG. 4 which shows a third embodiment of the anti-collision radar system according to the present invention. The circuitry shown in FIG. 4 is a driver's operation detector 40c which may be connected to the output of the second processor 34 shown in FIG. 1. The circuitry includes a pulse generator 42 which is the same as that shown in FIG. 1, a ring counter 64, first to fourth counters 66, 68, 70 and 72, an OR gate 76 and a second alarm 46. The same elements as shown in FIG. 1 are designated by like numerals. The output of the pulse generator 42 is connected to an input of the ring counter 64. The ring counter 64 has four output terminals which are respectively connected to reset terminals of the first to fourth counters 66, 68, 70 and 72. Each of the inputs of the first to fourth counters 66, 68, 70 and 72 are connected to each other and to the output of the second processor 34 shown in FIG. 1. The outputs of the first to fourth counters 66, 68, 70 and 72 are respectively connected to inputs of the OR gate 76 the output of which is connected to an input of the second alarm 46.

If the pulse generator is connected to the odometer 47 as shown in FIG. 1, and is arranged to produce an output pulse signal $S_1''$ after each predetermined distance of travel of the vehicle, the ring counter 64 produces output pulse signals at each output thereof when a predetermined number of pulses $S_1''$ are applied to same. Assuming the pulse generator 42 produces the pulse signal $S_1''$ at every 4 kilometers of travel, the ring counter 64 produces an output signal $S_8$ in synchronization with the input $S_1''$, an output signal $S_9$ when three pulse signals $S_1''$ are counted, an output signal $S_{10}$ when four pulse signals $S_1''$ are counted, and an output signal $S_{11}$ when five pulse signals $S_1''$ are counted; then the signals $S_8$, $S_9$, $S_{10}$ and $S_{11}$ are respectively produced when the vehicle travels 4, 12, 16 and 20 kilometers. These signals $S_8$, $S_9$, $S_{10}$ and $S_{11}$ are reset signals which are utilized for clearing the number accumulated in each first to fourth counters 66, 68, 70 and 72. The first to fourth counters 66, 68, 70 and 72 are respectively arranged to count the number of the collision imminence signals $S_0$ and to produce an output signal when the counted number reaches a pre-set number. The pre-set numbers for each first to fourth counters are 2, 3, 4 and 5 respectively. Since the outputs of the first to fourth counters 66, 68, 70 and 72 are supplied via the OR gate 76 to the second alarm 46, the second alarm 46 is energized at least one of the first to fourth counters produces an output signal.

With this provision, the driver's operation detector 40c provides four different distance units, i.e. 4, 12, 16 and 20 kilometers over which counting the number of the collision imminence signals $S_0$ is carried out. The numbers stored in each first to fourth counters 66, 68, 70 and 72 are canceled when the reset signals $S_8$, $S_9$, $S_{10}$ and $S_{11}$ are respectively applied to each counter so that each counter starts counting the number of collision imminence signals $S_0$ from zero after each predetermined distance of travel of the vehicle. Consequently, if the vehicle driver reinstates normal operation after energization of the second alarm 46, the second alarm 46 will not be energized after a reset signal is applied to the counter which has produced the output signal.

If desired, the number of counters may be changed and further the pre-set numbers for each counter may be changed.

Reference is now made to FIG. 5 which shows a fourth embodiment of the anti-collision radar system according to the present invention. The circuitry shown in FIG. 5 is a driver's operation detector 40d which has the same construction as that shown in FIG. 3 except that a third alarm 80 and fourth alarm 82 are provided instead of the OR gate 62 and the second alarm 46. In the fifth embodiment an input of the third alarm 80 is connected to the counter 50 while an input of the fourth alarm 82 is connected to the output of the adder 60. The third and fourth alarms 80 and 82 are independent from each other and are respectively arranged to receive signals $S_5$ and $S_6$. With this arrangement the third alarm 80 issues an alarm signal when a carry signal $S_3$ is produced by the counter 50, i.e. the number of the collision imminence signals $S_0$ reaches two during 4 kilometers traveled by the vehicle while the fourth alarm 82 issues an alarm signal when the number of the added signals in the adder 60 reaches four, i.e. the number of the collision imminence signal $S_0$ reaches four during 20 kilometers travel.

When lamps are utilized for the third and fourth alarms 80 and 82, the color of the lamps may be different from each other, for instance a yellow lamp for the third alarm 80 and a red lamp for the fourth alarm 82. Of course two buzzers or bells which have different tones may be utilized so that the vehicle driver will be able to distinguish which alarm is issuing an alarm signal. Moreover, a combination of a lamp and a buzzer or a bell may be utilized. The use of different tones or colors of alerting devices as mentioned above may be adopted for first and second alarms 36 and 46 shown in FIGS. 1, 3 and 4.

Figure 6:
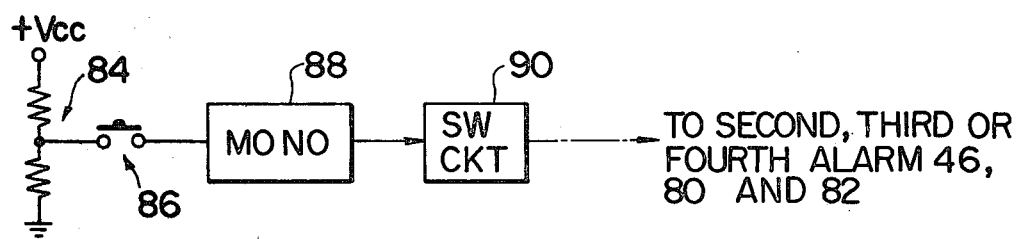
FIG. 6 illustrates in a schematic block diagram a variation of the first to fourth embodiments of the anti-collision radar system for a vehicle according to the present invention.

FIG. 6 illustrates a variation of the first to fourth embodiments of the anti-collision radar system according to the present invention. The circuitry shown in FIG. 6 may be connected to any of the embodiments previously shown. A voltage divider 84 is interposed between a positive power supply +Vcc and ground. A junction between two resistors (no numeral) which constitute the voltage divider 84 is connected to one terminal of a manual switch 86 while the other terminal of the manual switch 86 is connected to an input of a monostable multivibrator 88. The output of the monostable multivibrator 88 is connected to an input of a switching circuit 90 which is operatively connected to the second, third or fourth alarm 46, 80 and 82 which are shown in FIGS. 1, 3, 4 and 5.

The function of the circuitry shown in FIG. 6 is for disabling the second, third or fourth alarm 46, 80 and 82. Assuming the circuitry is operatively connected to the second alarm 46 shown in FIG. 1, when the vehicle driver notices that the second alarm 46 is issuing an alarm signal and he wishes to stop the alarm signal, the vehicle driver may push the manual switch 86 which is preferably a push-button type to turn on same. When the switch 86 becomes conductive, a predetermined voltage produced by the voltage divider 84 is fed to the input of the monostable multivibrator 88 for triggering same. The monostable multivibrator 88 is arranged to produce a pulse signal the pulse width of which is determined by the time constant of the monostable multivibrator 88 and thus the pulse width is constant. Upon presence of the output pulse signal the switching circuit 90 becomes nonconductive so that the second alarm 46 is disabled if the switching circuit 90 is interposed in the power supply line (not shown) of the second alarm 46 or between the output of the OR gate 62 and the input of the second alarm 46. With this provision, the second alarm 46 does not issue an alarm signal for a predetermined period of time which corresponds to the pulse width of the monostable multivibrator. After the predetermined period of time the second alarm 46 becomes operable again automatically. The circuit shown in FIG. 6 may be utilized with circuitry of other embodiments in the same manner.

Although only the pulse generator 42 is shown in FIGS. 3, 4 and 5, the pulse generator 42 may be connected to the odometer 47 which is shown in FIG. 1, or to the circuit shown in FIG. 2. As previously mentioned with respect to the first embodiment, the pulse generator 42 may be arranged to produce an output pulse signal in response to one or more vehicle parameters. Of course the pulse generator 42 may be a clock pulse generator which periodically produces pulses.

When such a clock pulse generator is utilized as the pulse generator 42, shown in FIGS. 3, 4 and 5, the clock pulse generator produces an output pulse signal at predetermined time intervals, for instance three minuts.

With this arrangement, the pulse generator 42 shown in FIG. 3 and FIG. 5 respectively produces the shift-command signal $S_1'$ or the pulse generator 42 shown in FIG. 4 produces output pulse signals which are counted by the ring counter 64. It is to be noted that the pulse generator 42 in all embodiments is utilized for providing a counting period either in the form of distance traveled when an odometer 47 is employed, or in the form of a time unit when a clock pulse generator is utilized. If desired, the counting period provided by the pulse generator 42 may be modified for some other vehicle parameter such as vehicle speed.

What is claimed is:

1. An anti-collision radar system provided with circuitry for monitoring a driver's ability to safely control a vehicle, comprising:
   (a) a radar which detects the possibility of collision of the vehicle against an obstacle ahead for producing a collision imminence signal with which an alarm and/or a brake actuator is energized;
   (b) reference period providing means;
   (c) counting means connected to said reference period providing means for producing at least one output signal when the number of the collision imminence signals reaches at least one predetermined value during at least one reference period which is provided by said reference period providing means; and
   (d) alerting means connected to said counting means for alerting the vehicle driver upon presence of said output signal of said counting means.

2. A system as claimed in claim 1, wherein said reference period providing means comprises:
   (a) an odometer which produces an output signal at each time the vehicle travels a predetermined distance; and
   (b) a pulse generator connected to said odometer for producing an output pulse signal in response to the odometer output signal.

3. A system as claimed in claim 1, wherein said reference period providing means comprises a clock pulse generator which produces an output pulse signal at every predetermined period of time.

4. A system as claimed in claim 1, wherein said reference period providing means comprises:
   (a) an odometer for producing an output signal at each time the vehicle travels a predetermined distance;
   (b) a clock pulse generator for producing an output pulse signal at every predetermined period of time; and
   (c) switching means connected to both of said odometer and said clock pulse generator for selectively supplying the output signals thereof to said counting means.

5. A system as claimed in claim 1, wherein said counting means comprises at least one pre-set counter.

6. A system as claimed in claim 1, wherein said counting means comprises:
   (a) first counting means for producing an output signal when the number of the collision imminence signals reaches a first predetermined number during a first reference period;
   (b) at least one second counting means for producing an output signal when the number of the collision imminence signals reaches a second predetermined number which is larger than said predetermined number, during a second reference period which is longer than said first reference period.

7. A system as claimed in claim 1, wherein said counting means comprises:
   (a) a counter for counting the number of said collision imminence signals applied thereto, said counter producing a carry signal when the counted number reaches a predetermined value;
   (b) a plurality of latches connected in series for successively shifting the number which is counted by said counter, upon presence of a shift-command signal, said reference period providing means generating said shift-command signal; and
   (c) an adder connected to said counter and to said plurality of latches for adding the numbers stored therein, said adder producing an output signal when the added number reaches a predetermined value.

8. A system as claimed in claim 1, wherein said reference period providing means comprises:
   (a) a pulse generator;
   (b) a ring counter connected to said pulse generator for successively producing a plurality of output reset signals when predetermined numbers of pulses are fed thereto; and wherein said counting means comprises:
   a plurality of counters the inputs of which are connected to each other for receiving said collision imminence signals and for counting the number of said collision imminence signals, each of said plurality of counters producing an output signal when the respectively counted number reaches a predetermined number which is different in each counter, during a counting period which is different for each counter, said counting period being determined by two consecutive reset signals respectively applied to each counter from said ring counter.

9. A system as claimed in claim 6, wherein said alerting means comprises:
   (a) a logic circuit connected to said first counting means and to said second counting means for producing an output signal when at least one of the output signals from said first and second counting means is fed thereto; and
   (b) an alerting device connected to said logic circuit for issuing an alarm signal upon presence of the output signal of said logic circuit.

10. A system as claimed in claim 6, wherein said alerting means comprises:
    (a) a first alerting device connected to said first counting means for issuing a first alarm signal upon presence of an output signal of said first counting means; and
    (b) a second alerting device connected to said second counting means for issuing a second alarm signal upon presence of an output signal of said second counting means.

11. A system as claimed in claim 1, further comprising manually operable disabling means connected to said alerting means for disabling said alerting means.

12. A system as claimed in claim 11, wherein said manually operable disabling means comprises;
    (a) predetermined voltage applying means;
    (b) a manual switch one terminal of which is connected to said predetermined voltage applying means;
    (c) a monostable multivibrator the input of which is connected to the other terminal of said manual switch, said monostable mutivibrator producing an output pulse the pulse width of which is constant; and
    (d) a switching circuit connected to said monostable multivibrator for being energized upon presence of said pulse signal, said switching circuit being operably connected to said alerting means for disabling same when energized.

* * * * *